A. G. C. PITTEVIL.
WELDING OF DIFFERENT METALS TO FORM A COMPOSITE INGOT.
APPLICATION FILED OCT. 14, 1918.
1,374,110.
Patented Apr. 5, 1921.
2 SHEETS—SHEET 1.
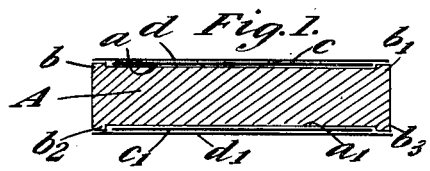
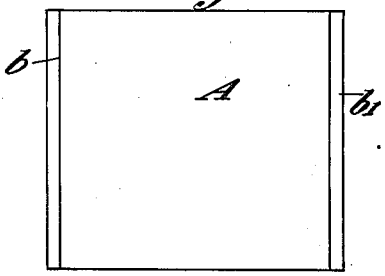
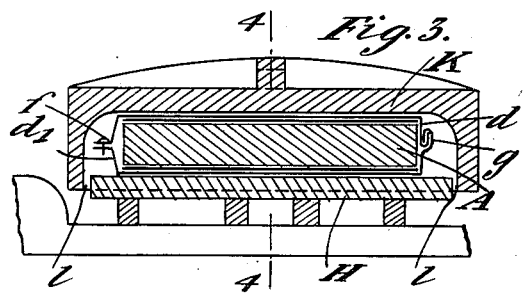
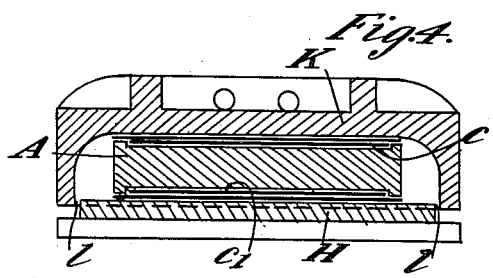

A. G. C. PITTEVIL.
WELDING OF DIFFERENT METALS TO FORM A COMPOSITE INGOT.
APPLICATION FILED OCT. 14, 1918.
1,374,110.
Patented Apr. 5, 1921.
2 SHEETS—SHEET 2.
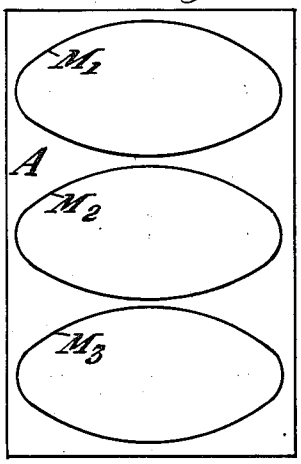
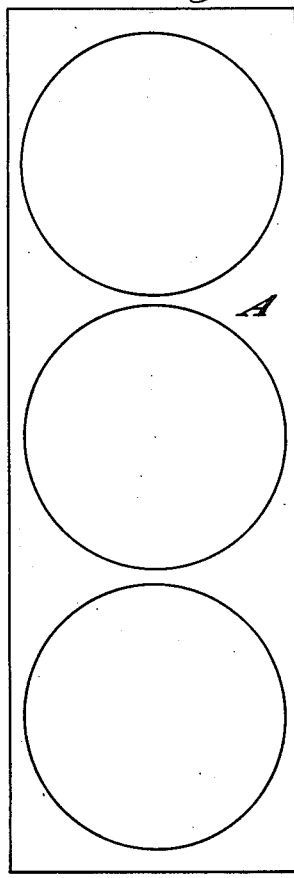

UNITED STATES PATENT OFFICE.

ALOIS GERARD CORNEILLE PITTEVIL, OF LONDON, ENGLAND.

WELDING OF DIFFERENT METALS TO FORM A COMPOSITE INGOT.

1,374,110.  Specification of Letters Patent.  Patented Apr. 5, 1921.

Application filed October 14, 1918. Serial No. 258,013.

*To all whom it may concern:*

Be it known that I, ALOIS GERARD CORNEILLE PITTEVIL, a subject of the King of Belgium, residing in London, England, have invented certain new and useful Improvements Relating to the Welding of Different Metals to Form a Composite Ingot, of which the following is a specification.

The invention relates to improved means for welding two or more different metals to form a composite ingot, which can be afterward rolled or drawn into sheets, tubes, wires or other forms.

Such processes have been applied for economy, as when part of a section of a sheet of copper or brass is replaced by steel, or for increasing the strength of the ultimate product, as, for example, where a tube is formed of copper inside and steel outside, or for other well-known purposes.

In known processes for this purpose considerable difficulties are experienced in obtaining a satisfactory result more especially when the metals to be welded melt at very different temperatures. These difficulties are still further increased when one metal, as is usually the case, is steel and more particularly when the covering metal has considerable thickness. If, for instance, it is required to weld steel to brass, at the welding temperature part of the zinc present in the alloy is very liable to be oxidized. The presence of either zinc or oxid of zinc precludes the union of the metals.

These difficulties are obviated by the process according to the invention which enables a perfectly reliable union to be obtained with different metals under all conditions required for practical purposes and at small cost.

According to the invention, the welding surface or surfaces of a steel or other ingot are first prepared by a milling or other cutting tool, since the process of grinding usually adopted for this purpose does not remove all the impurities or foreign substances present but tends to press them into the substance of the ingot.

In preparing the surface of the ingot by the cutting tool, wherever possible a narrow flange is left on either side of the ingot between which the sheet of other metal is inserted so as to hold the metals during the manipulation and heating process against lateral displacement and longitudinal displacement is prevented by a protecting metal cover which is securely fastened in contact with the compound ingot. An anti-adherent composition is applied to the inner surfaces of the protecting cover or to the parts protected by the cover to prevent it from adhering to the composite ingot during the welding process. A suitable substance for this purpose is obtained by adding calcic phosphate to a mixture of phosphoric acid and oil of turpentine. This covering is retained during the first pass through the rolls or other means for applying the welding pressure.

A sheet or strip of copper or other metal which combines wholly or partly with a constituent of the metals to be welded and of the thickness of about one hundredth of an inch is interposed between the metals to be welded.

The thin sheet of copper which, preferably, should be pure is especially useful if an alloy such as brass is to be welded to a steel ingot. The copper sheet on the surface in contact with the brass apparently absorbs and combines with any zinc decomposed from the brass and on the surface in contact with the steel forms a combination, with the result that the copper disappears entirely or almost entirely (according to the thickness of the sheet) and forms a perfect union between the metals to be welded.

If the covering metal is of considerable thickness it is preferably divided into rolled sections and between each section is placed a thin sheet, which can be either of the covering metal or of copper; but such thin sheet placed between the surfaces of the different metals to be welded should always be of copper or of a metal which combines wholly or partly with a constituent of the metals to be welded together.

If it is wished to weld a steel ingot to a brass covering of say one-fifth of an inch in thickness, upon the steel is placed a copper sheet of about 1/125th of an inch thick. Upon this copper sheet is placed a brass sheet of about 9/250th of an inch, upon this a thicker brass sheet of about 16/250th of an inch, then a thinner brass sheet of 9/250th of an inch and finally another brass sheet of 16/250th of an inch.

If the ingot is of steel, the surfaces of the ingot to which the other metals are to be welded are covered, after they have been prepared by a cutting tool, with a metallic substance that is easily fusible, preferably with tin, as in the usual tin plating process. During the heating process the tin fuses and maintains an intimate contact between the metals and by preventing any access of air obviates any tendency to oxidation. The compound ingot is heated to the required temperature in a closed receptacle placed in a furnace. When the required temperature has been attained the compound ingot with the metal covering is taken to a rolling mill or other appliance by which the welding is effected progressively in the longitudinal direction of the composite ingot.

It is of importance that a pressure applying device of the type described should be used for this purpose instead of devices in which the whole of the surfaces to be welded together are pressed in contact by hydraulic or other means and consequently in which there is no ready escape of any gases which may be present. Such gases, on the other hand, are readily expelled in a rolling mill or the like by which the parts are welded in succession.

The protecting covering can then be removed and the composite ingot rolled to the required dimensions in strip or other form from which usually parts of a definite shape are punched according to the purpose for which the composite material is required. If, for example, circular disks are punched from a strip there would be nearly 40 per cent. of scrap consisting of composite metal, which could not be used for other purposes and would consequently mean a considerable waste of expensive material.

To avoid such waste the ingot is milled and the sheets of copper or other metal with which the ingot is to be coated are cut to fit in the milled out part of the ingot, experience enabling the necessary allowance to be made for the change of shape and dimensions produced by rolling. By this method the resultant scrap consisting of one metal, usually steel, is not wasted but can be again melted down. Composite circular disks, which may be ultimately pressed into tubes in well known manner can be obtained from elliptical disks of copper, brass or other metals fitting in similar shaped depressions in the steel ingot.

For the purpose of obtaining wires having, for example, a steel core covered with copper, the process is as follows:—A steel bar of suitable cross section is cleaned and covered with tin and over it is wound spirally a very thin strip of preferably pure copper. A copper sheet of the required thickness, of a width equal to the circumference of the bar and of the same length as the bar is bent into a tube of slightly less diameter than the bar. The copper tube is then pressed on to the surface of the bar and covered on the outside with the anti-adherent mixture. The composite metal bar is then inclosed in a thin metal tube with an open longitudinal joint and placed in a receptacle in which pressure is applied concentrically at parts of the surface of the bar; in this condition the composite bar is heated to the required temperature and then passed once through a rolling mill after which the metal covering is removed and the bar can be drawn into wire of the required gage.

The accompanying drawings represent an example of means for carrying out the process according to the invention. In Figures 1-6 it is assumed that sheets of copper are to be welded, respectively, to the upper and lower surfaces of a steel ingot for the purpose of obtaining rolled sheets having a central part covered with copper on both sides.

Fig. 1 is a section and Fig. 2 a plan of the steel ingot; Fig. 3 shows in section the ingot inside the receptacle during the heating treatment. Fig. 4 is a section on the line 4—4 of Fig. 3. Figs. 5 and 6 illustrate the process as applied to the production of circular disks for forming coated tubes or other purposes.

Referring to Figs. 1-4, when copper sheets $c$, $c_1$ are to be welded, respectively, to the surfaces $a$, $a_1$ of a steel ingot A, these surfaces are prepared by a cutting tool so as to be smooth and even and flanges $b$, $b_1$, $b_2$, $b_3$ are left to prevent any lateral displacement of the copper sheets.

The parts to be welded are then covered by sheets $d$, $d_1$ of steel or iron as shown in Figs. 1, 3 and 4; these sheets are tightened over the ingot by any suitable means; in the example shown they are riveted at $f$ and sprung together at the other end by a fastening $g$. The inner surfaces of this covering are, as explained above, coated with a substance which prevents them from adhering to the ingot.

The composite ingot is then placed in a receptacle of which H is the base and K is the cover, the weight of which is supported by the ingot and causes all the parts to come into intimate contact. The spaces $l$ between the base and the cover are stopped by clay to prevent any access of air.

The receptacle and its contents are now slowly heated to the required temperature and when this has been attained the receptacle and its contents are taken to a rolling mill or other appliance in which the welding is progressively effected. The composite ingot A still inclosed within the sheet metal covering $d$, $d_1$ is then passed through the rolls. A single pass is sufficient to complete the welding action and to drive off any gases which might be present between the surfaces of the welded metals. The covering $d$, $d_1$ can now be removed and the ingot rolled to the required dimensions.

Figs. 5 and 6 illustrate the process according to the invention as applied to the production of circular disks of which in the example three are to be formed from the rolled ingot.

In Fig. 5, A represents a steel ingot; $M_1$, $M_2$, $M_3$ are elliptical depressions cut by a milling tool. The transverse diameter of each ellipse corresponds to that of the required circular disks; the longitudinal diameter is such that after rolling it will be drawn out to correspond to the diameter of the circular disks. The depth of the depression is sufficient to provide a smooth surface in which all irregularities and oxids have been removed and in which the previously cut sheet to form the required coating is held.

The steel ingot with the copper sheet in position is surrounded by a metal sheet, the non-adhesive material being introduced between the sheet and the ingot; the sheet is then tightened by any suitable means and the ingot transferred to a receptacle in which it is heated as described above and afterward passed once through the rolls. The welding is now complete, the sheet covering can be removed and the ingot rolled until the ellipses have been drawn out to the required circular form as shown in Fig. 6. The disks can now be punched out and the resulting steel scrap can be melted down.

In the process of constructing any other composite body, a similar allowance is made for the extension of the ingot in the direction of rolling.

It is obvious that the processes according to the invention are not restricted to coating steel with copper; brass and other metals may form the coating and other metals may replace the steel ingots.

The method is advantageously applied to the manufacture of articles such as spoons and forks in which silver, for instance, punched out to the required shape, may be welded to steel previously coated with copper as heretofore explained.

Tubes may be formed in which steel is coated, for example, with copper in the inside and brass on the outside.

Having thus described the nature of the said invention and the best means I know of carrying the same into practical effect, I claim:—

A process of welding a ferrous to a non-ferrous metal, in which a thin sheet of a metal adapted to combine with a constituent of said non-ferrous metal is interposed between the metals to be welded together.

In testimony whereof I have signed my name to this specification.

ALOIS GERARD CORNEILLE PITTEVIL.